(12) United States Patent
Gleasman et al.

(10) Patent No.: US 7,824,289 B2
(45) Date of Patent: Nov. 2, 2010

(54) STEER DRIVE FOR TRACKED VEHICLES

(75) Inventors: Keith E. Gleasman, Fairport, NY (US); James Y. Gleasman, Rochester, NY (US); Donald Gabel, Rochester, NY (US); Matthew R. Wrona, Fairport, NY (US)

(73) Assignee: Torvec, Inc., Rochester, NY (US)

( * ) Notice: Subject to any disclaimer, the term of this patent is extended or adjusted under 35 U.S.C. 154(b) by 523 days.

(21) Appl. No.: 11/924,022

(22) Filed: Oct. 25, 2007

(65) Prior Publication Data

US 2008/0103005 A1   May 1, 2008

Related U.S. Application Data

(63) Continuation-in-part of application No. 11/553,592, filed on Oct. 27, 2006, now abandoned.

(51) Int. Cl.
*F16H 48/20* (2006.01)
*B62D 11/06* (2006.01)

(52) U.S. Cl. .......................................... 475/18; 475/249
(58) Field of Classification Search .................... 475/18, 475/248, 249
See application file for complete search history.

(56) References Cited

U.S. PATENT DOCUMENTS

| | | | |
|---|---|---|---|
| 1,984,830 A | | 12/1934 | Higley |
| 2,213,473 A | * | 9/1940 | Peterman ................. 180/24.03 |
| 2,763,164 A | | 9/1956 | Neklutin |
| 2,859,641 A | | 11/1958 | Gleasman |
| 3,027,780 A | | 4/1962 | Storer, Jr. et al. |
| 3,735,647 A | | 5/1973 | Gleasman |
| 3,776,326 A | * | 12/1973 | Davin et al. .................. 180/9.1 |
| 4,497,218 A | | 2/1985 | Zaunberger |
| 4,732,053 A | | 3/1988 | Gleasman et al. |
| 4,776,235 A | | 10/1988 | Gleasman et al. |
| 4,895,052 A | | 1/1990 | Gleasman et al. |
| 4,907,672 A | | 3/1990 | Muzzarelli |
| 5,186,692 A | | 2/1993 | Gleasman et al. |
| 5,390,751 A | | 2/1995 | Puetz et al. |
| 5,531,282 A | * | 7/1996 | Jennen ........................ 180/9.1 |
| 6,135,220 A | * | 10/2000 | Gleasman et al. ............. 180/9.1 |
| 6,342,021 B1 | | 1/2002 | Gleasman et al. |
| 6,554,729 B2 | | 4/2003 | Gleasman et al. |
| 6,783,476 B2 | | 8/2004 | Gleasman et al. |

* cited by examiner

*Primary Examiner*—Ha D. Ho
(74) *Attorney, Agent, or Firm*—Brown & Michaels, PC

(57) ABSTRACT

The differential steering drive for a tracked vehicle includes a drive differential interconnecting the drive shafts for the tracks and a steering differential for superimposing additive and subtractive rotations to the tracks for steering and pivot turning. In the preferred embodiment for high speed tracked vehicles, the drive differential is an all-gear no-clutch type limited-slip differential, and the steering differential is an unlimited-slip differential. The differentials are arranged to provide no-slip track operation traveling in straight paths or when steering so long as at least one track has traction. In another embodiment for pivot-turning slow-moving off-road vehicles, both the drive differential and the steering differential are all-gear no-clutch type limited-slip differentials. Further, both embodiments preferably include an additional left-side and an additional right-side all-gear no-clutch type limited-slip differential for dividing the torque delivered to a respective pair of drive axles associated with each track.

5 Claims, 5 Drawing Sheets

STEER DRIVE FOR TRACKED VEHICLES

REFERENCE TO RELATED APPLICATIONS

This is a continuation-in-part application of patent application Ser. No. 11/553,592, filed Oct. 27, 2006, entitled "STEER DRIVE FOR TRACKED VEHICLES". The aforementioned application is hereby incorporated herein by reference.

BACKGROUND OF THE INVENTION

1. Field of the Invention

The invention pertains to the field of tracked vehicles. More particularly, the invention pertains to a steer drive with a differential for improved performance of a tracked vehicle under extreme low traction conditions.

2. Description of Related Art

Differential steering systems for tracked vehicles are well known. Such prior art track steering systems are often identified by such terms as "double differentials", "steer drives", and "cross-drive transmissions", and these prior art steering systems are equally applicable to multi-wheeled off-road vehicles having no angularly adjustable turning axle. Of this prior art, the Gleasman steer drive disclosed in U.S. Pat. No. 4,776,235 has proven to be relatively inexpensive and remarkably effective in testing conducted on a full-terrain tracked vehicle ("FTV®") built by Torvec, Inc. Using the Gleasman steer drive, the operator readily steers the FTV vehicle with a conventional steering wheel, as contrasted to the more conventional bulldozer-type drives with separate left and right control levers for each track, when traversing paved highways at highway speeds as well as when traversing off-road terrain.

Teachings of the prior art indicate that only some conventional form of unlimited-slip differential gearing may be used between the vehicle's engine and the track drives so as not to impair differential rotation of the drive axle shafts. All prior art differential steering drives for tracked vehicles use some conventional form of unlimited-slip differential gearing between the vehicle's engine and the track drives. Apparently, persons skilled in the art have believed that such a drive differential must be a differential lacking any limited-slip devices.

During extensive testing, a problem has been noticed when the FTV tracked vehicle is being turned on terrain that includes portions having unusually low traction. For instance, where one track of the vehicle is traversing extremely soft mud, that track can occasionally lose all traction and begin to "slip". This is similar to the undesirable slipping that occurs in a truck with a conventional unlimited-slip differential, where one set of drive wheels begins to slip on mud, ice, or snow. When the FTV vehicle is turning and the entire track on one side of the vehicle loses traction, the turn is interrupted. In other types of differential drives if the track continues to slip when turning, the drive torque of the vehicle can be completely lost.

As explained in U.S. Pat. No. 4,776,235, the Gleasman steer drive is "no-slip" so long as the tracked vehicle is moving straight ahead or straight back and the steering wheel is held still by the operator. This no-slip condition results from the fact that the drives of both tracks are locked together when the steering worm/worm-wheel combination of the vehicle's steer drive is held motionless. Under this condition, the track drive shafts operate as if they were on straight axles without any separating differential. Nonetheless, when the steering motor drive of this prior art steer drive superimposes different track speeds for turning, the steering worm/worm-wheel combination begins to rotate, and this locked condition is lost. That is, the steer drive introduces differential action between the tracks, and when the drive shafts are differentiating, the loss of drive torque, i.e., slipping, may occur as it does in all conventional unlimited-slip differentials when one drive axle loses traction.

The sharpest turn that a conventional bulldozer-type drive, with separate left and right control levers for each track, can make is by braking one track while driving the other track, and this stresses the braked track considerably. Pivot turns using the Gleasman steer drive involve changing the direction of the vehicle with little or no translational movement of the pivot point at the center of the vehicle. Pivot turns can be power-assisted or powered totally by driving torque to be executed more rapidly. Since a vehicle is not using driving torque for forward or rearward movement when pivot turning occurs, driving torque is available for powering pivot turns. A slippage, similar to the turn slippage described previously, occurs during pivot turning, when one of the tracks is mired in a low-traction medium.

The interruption of steering or the loss of drive torque when one track slips, is endemic in all differential track drives and has apparently occurred in steer-driven tracked vehicles since their inception. As indicated in documentary information provided on television for the public with the consent of the United States government, this same slipping condition occurs with steer driven U.S. Army Abrams tanks. Abrams tanks also include a steering-wheel type drive in contrast to the more conventional bulldozer-type drives with separate left and right control levers for each track. While this condition is not sufficient to detract from the many advantages of tracked vehicles, it certainly has been a problem that has been plaguing tracked vehicles for a long time, and it occurs often enough in severe off-road terrain to justify correction. Avoidance of such undesirable steering problems is of particular importance for those few tracked vehicles that are capable of traveling at highway speeds.

There is a need in the art for a steer drive that prevents slippage when torque is suddenly reduced and that facilitates pivot turning for the tracked vehicle under extreme low traction conditions.

SUMMARY OF THE INVENTION

The differential steering drive for a tracked vehicle includes a drive differential interconnecting the respective drive shafts for the tracks and a steering differential for superimposing respective additive and subtractive rotations to the tracks for steering and pivot turning. In a preferred embodiment for high speed tracked vehicles, the drive differential is an all-gear no-clutch type limited-slip differential, and the steering differential is an unlimited-slip differential. The two differentials are arranged to provide no-slip track operation traveling in straight paths or when steering under all conditions so long as at least one track has traction. In another embodiment, both the drive differential and the steering differential are all-gear no-clutch type limited-slip differentials. This second embodiment may be appropriate for pivot turning some slower moving off-road vehicles.

The differential steering-drive for a vehicle includes a drive differential and a steering differential. The vehicle includes respective left and right driving tracks or driving traction elements, a propulsion engine with an engine drive shaft, and a steering wheel rotatable by an operator to indicate an intended direction of travel.

The drive differential interconnects the engine drive shaft and a pair of respective drive shafts for differentially driving the respective left and right driving traction elements. The steering differential operatively interconnects the steering wheel and the respective track drive shafts so that rotation of the steering wheel in a first direction causes rotation of the steering differential in a first direction and rotation of the steering wheel in the opposite direction causes rotation of the steering differential in an opposite direction. The speed of rotation of the steering differential in each direction is proportional to the angular rotation of the steering wheel. The rotation of the steering differential in a first direction results in the rotation of the respective track drive shafts in opposite directions. In one embodiment, at least one of the drive and steering differentials includes an all-gear limited-slip differential.

In the preferred embodiment, the drive differential includes an all-gear limited-slip differential. In a second embodiment, the drive differential includes an all-gear limited-slip differential and the steering differential includes an all-gear limited-slip differential.

Both embodiments are also extended to provide an additional left-side all-gear limited-slip differential and an additional right-side all-gear limited-slip differential for dividing the torque delivered to a respective pair of drive axles associated with each track. That is, while the first two all-gear limited-slip differentials divide the torque between the respective drive shafts directing the engine torque to the respective left and right tracks, the two additional all-gear limited-slip differentials further divide each respective track torque between the front and rear drive axles of each respective track.

The all-gear limited-slip differential preferably includes a crossed-axis gear complex having a pair of side-gear worms and at least two sets of paired combination gears. Each side-gear worm is mounted for rotation about an output axis and fixed to a respective output axle. Each combination gear has an axis of rotation that is substantially perpendicular to the output axis. Each combination gear also has a first gear portion spaced apart from a worm-wheel portion. The first gear portions of the combination gear pair are in mating engagement with each other, and the worm-wheel portions of the combination gear pair are in mating engagement with a respective one of the side-gear worms. The all-gear limited-slip differential preferably includes a thrust plate maintained in a fixed position between the inner ends of the pair of side-gear worms.

DETAILED DESCRIPTION OF THE INVENTION

Figure 1:
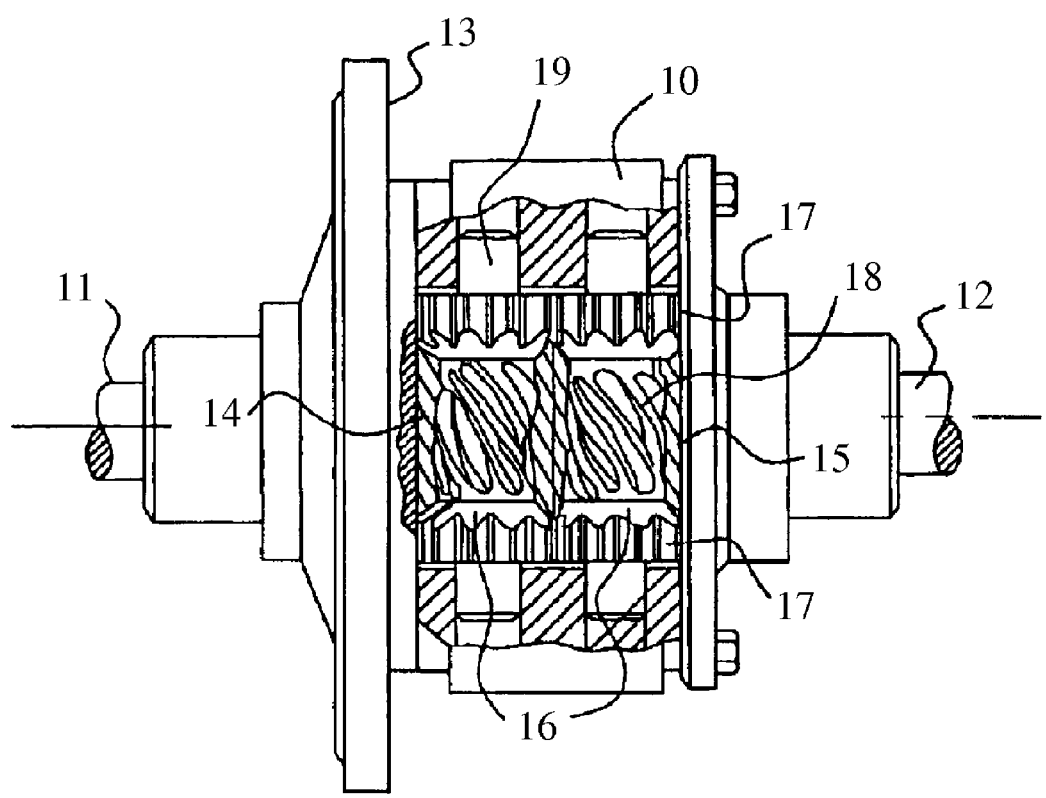
FIG. 1 shows a partially cross-sectioned side view of a first full-traction differential for use in the present invention.

The present invention is related to the subject matter of U.S. Pat. No. 3,735,647, "SYNCLINAL GEARING", issued to Gleasman on May 29, 1973; U.S. Pat. No. 4,776,235, "NO-SLIP, IMPOSED DIFFERENTIAL REDUCTION DRIVE", issued to Gleasman et al. on Oct. 11, 1988; U.S. Pat. No. 6,135,220, "MODULAR SYSTEM FOR TRACK-LAYING VEHICLE", issued to Gleasman et al. on Oct. 24, 2000; and U.S. Pat. No. 6,783,476, "COMPACT FULL-TRACTION DIFFERENTIAL", issued to Gleasman et al. on Aug. 31, 2004, all of which are hereby incorporated by reference herein.

Teachings of the prior art steer-drives indicate that only conventional forms of unlimited-slip differential gearing may be used between a vehicle's engine and the track drives so as not to impair differential rotation of the drive axle shafts. However, undesirable slipping often occurs in a tracked vehicle when the vehicle is being steered, because the steering drive motor is moving the otherwise locked-up drive of the steering differential and, thus, both differentials are differentiating. Under this condition, should one of the tracks suddenly lose traction, the torque load becomes significantly out of balance, allowing the slipping track to increase in speed and reducing the speed and drive torque on the other track in relation to the increased speed of the slipping track. [NOTE: Persons skilled in the art will appreciate that, although the traction elements referred to herein are primarily "tracks", the multiple-wheel units used to support and drive the tracks can, and have been, used by themselves as vehicle traction elements and, therefore, the disclosed differential steering-drive of the invention can also be appropriately used to control the drive shafts of such respective left and right multi-wheel traction elements for steering such a multi-wheel vehicle.]

At least one of the drive and steering differentials of the present invention is an all-gear limited-slip type of differential as opposed to the conventional unlimited-slip differentials taught in the prior art. A limited-slip differential allows for a difference in rotational velocities of the differentiating output shafts but does not allow the difference to increase beyond a set amount. Some all-gear differentials cause the gears to bind together or against the housing to provide a torque bias when traction is lost. However, the preferred all-gear limited-slip differentials of the invention use the mechanical advantage of the worm-like design of the side gears operating against the worm-wheel design of the combination gears to allow normal differential action around a turn, and should the traction under one drive component become significantly less than the traction under the other drive component, this same mechanical advantage prevents the transfer of excess torque to the drive component with less traction. Increasingly greater torque is transferred to the traction component having greater traction until the difference in the torque being transferred to each drive component reaches a predetermined torque bias ratio. The gear design determines the torque bias ratio, which is the ratio of torque applied to the traction component with better traction to the torque applied to the component having lesser traction.

In the preferred embodiment, the drive differential is an all-gear limited-slip type differential, and the steering differential is a conventional unlimited-slip differential. In a second embodiment, the drive differential and the steering differential are both all-gear limited-slip type differentials. A further embodiment extends each of these just-identified embodiments by combining them with additional right- and left-side differentials, both of which are all-gear limited-slip type differentials, for distributing torque to the front and rear drive-axles for each of the vehicle's respective left and right driving traction elements.

The use of an all-gear limited-slip type of differential as the drive differential of the steer drive prevents the above-described condition that occurs when traction is suddenly reduced under one drive member. While any all-gear limited-slip differential may be used in any steer drive of the present invention, the all-gear differentials discussed herein are preferred, namely, the older crossed-axis design shown in FIG. 1 that was widely used under the trademark "Torsen®" or the more recent compact crossed-axis design shown in FIGS. 2A and 2B and identified commercially by the trademark "Iso-Torque™". As just stated above, avoidance of such undesirable steering problems is of particular importance for those few tracked vehicles that are capable of traveling at highway speeds. This important revision, however, does not otherwise affect the operation of the basic features of the original steer-drive, which continues to function in the same manner. Namely, when the vehicle is being driven in a straight direction, the differentials still both act as straight axles, and when the vehicle operator indicates a change in direction by turning the vehicle's steering wheel, the steering motor still turns the housing of the steering differential either forward or in reverse, and the speeds of the tracks are respectively increased and decreased to accomplish the change of direction as explained in U.S. Pat. No. 4,776,235.

With the present invention's use of the limited-slip differential, pivot turns still change the direction of the vehicle with little or no translational movement of the pivot point at the center of the vehicle. Pivot turns are still preferably powered totally by substantial torque provided by the separate differential steering system motor, since the torque of that steering motor is still greatly increased by the worm/worm-wheel gearing ratio (preferably ≧15:1).

During such pivot turning with prior steering systems, the vehicle operator generally applies a brake to, or otherwise holds, the engine drive shaft in a locked condition. However, when pivot turning with heavy, relatively slow-moving off-road vehicles, conditions arise such that it is not desirable to lock the engine drive shaft. In these latter instances, should the traction load being shared between the tracks become significantly unbalanced, the pivoting motion may be completely stopped. This pivot turning problem in prior steering systems is avoided in the present invention by replacing the traditional steering differential with an all-gear limited-slip type of differential that does not slip when such torque imbalance occurs. Nonetheless, for all faster-moving track-laying vehicles, the steering differential should preferably remain a conventional unlimited-slip all-gear type.

Limited-Slip Differential

As shown in FIG. 1, a first embodiment of a limited-slip differential for use in the present invention includes a rotatable gear housing 10 and a pair of drive axles 11, 12 received in bores formed in the sides of housing 10. This type of differential, as disclosed in U.S. Pat. No. 3,735,647, has enjoyed fairly widespread use and publicity throughout the world under the Torsen® trademark. This limited-slip differential, which is an all-gear differential, includes no slipping plates or other form of clutch apparatus and uses either a crossed-axis or a parallel axis arrangement in a "compound planetary gear complex" format. While either of these formats may be used, the crossed-axis differential format is preferred, and only this format is explained with greater particularity in the following discussion.

A flange 13 is preferably formed at one end of housing 10 for mounting a ring gear (not shown) for providing rotational power from an external power source, typically from a vehicle's engine. The gear arrangement within housing 10 is often called a "crossed-axis compound planetary gear complex" and preferably includes a pair of side-gear worms 14, 15 fixed, respectively, to the inner ends of axles 11, 12 and several sets of combination gears 16 organized in pairs. Each combination gear preferably has outer ends formed with integral spur gear portions 17 spaced apart from a "worm-wheel" portion 18. While standard gear nomenclature uses the term "worm-gear" to describe the mate to a "worm", this often becomes confusing when describing the various gearing of an all-gear differential. Therefore, as used herein, the mate to a worm is called a "worm-wheel".

Each pair of combination gears 16 is preferably mounted within slots or bores formed in the main body of housing 10 so that each combination gear rotates on an axis that is substantially perpendicular to the axis of rotation of side-gear worms 14, 15. In order to facilitate assembly, each combination gear 16 preferably has a full-length axial hole through which a respective mounting shaft 19 is received for rotational support within journals formed in housing 10.

Combination gears are known with integral hubs that are received into the journals of housing 10, but to facilitate design of the housing and assembly, the combination gears of most presently-used limited-slip differentials of this type are shaft-mounted. The spur gear portions 17 of the combination gears 16 of each pair are in mesh with each other, while the worm-wheel portions 18 are, respectively, in mesh with one of the side-gear worms 14, 15 for transferring and dividing torque between axle ends 11, 12. In order to carry most automotive loads, prior art differentials of this type usually include three sets of paired combination gears positioned at approximately 120° intervals about the periphery of each side-gear worm 14, 15.

This type of differential does a remarkable job of preventing undesirable wheel slip under most conditions. In fact, one or more of these limited-slip differentials are either standard or optional on vehicles presently being sold by at least eight major automobile companies throughout the world, and there are two Torsen® crossed-axis limited-slip differentials in every U.S. Army HMMWV ("Hummer") vehicle, one differentiating between the front wheels and the other between the rear wheels.

Figure 2A:
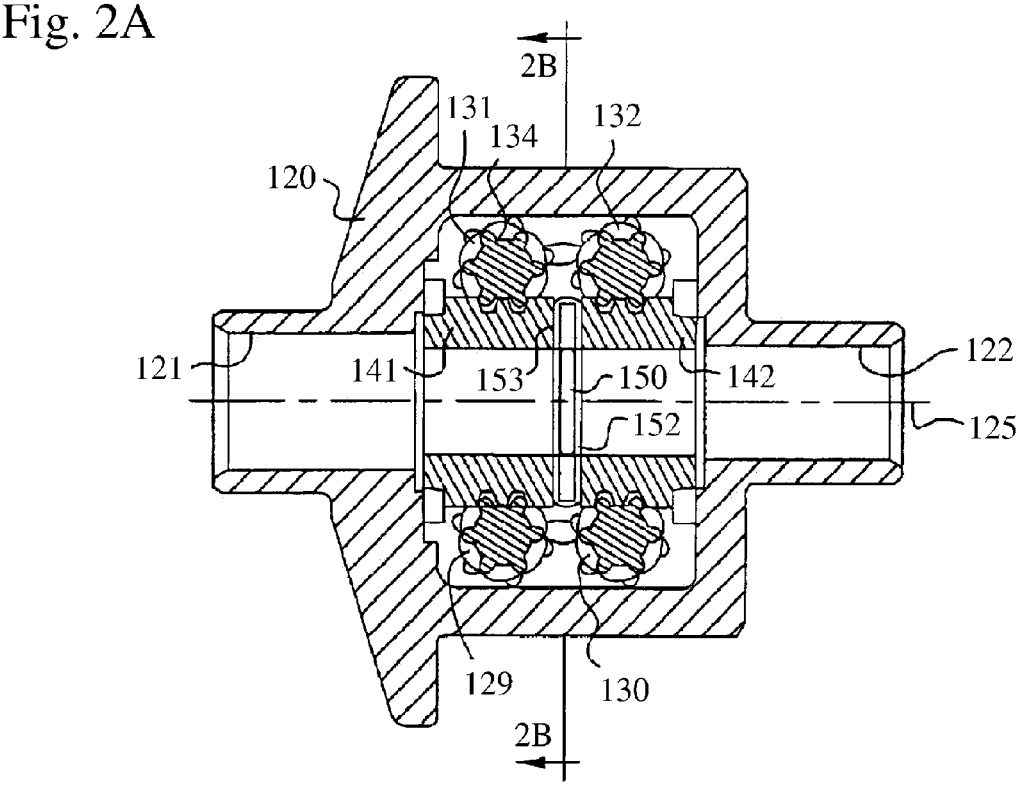
FIG. 2A is a schematic cross section of a second full-traction differential for use in the present invention including a complete worm/worm-wheel gear complex incorporated within a one-piece housing.
Figure 2B:
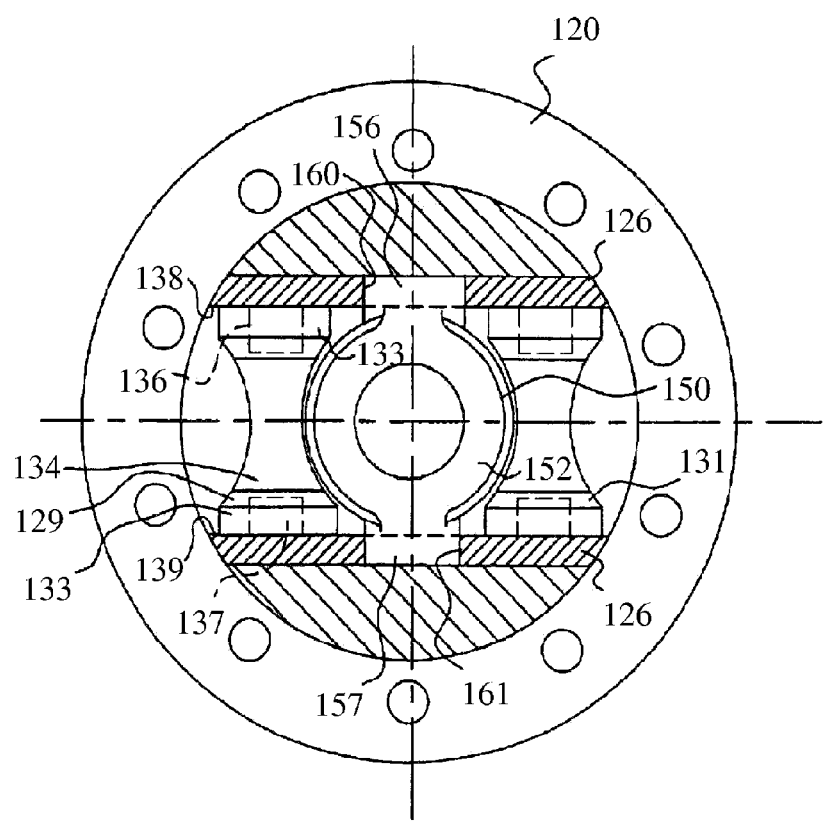
FIG. 2B is a schematic cross section as viewed along line 2B-2B of FIG. 2A.

A second embodiment of a more recent design of limited-slip differential for use in the present invention is shown in FIGS. 2A and 2B. This second embodiment is disclosed in greater detail in copending application Ser. No. 11/553,603, filed Oct. 27, 2006 and entitled "Full-Traction Differential with Hybrid Gearing", and is presently being marketed under the name "IsoTorque™". The contact pattern of this new design spreads the load over such a significantly wider area that it is possible to use only two pairs of combination gears (spaced, respectively, at 180° intervals) rather than the more conventional three pairs (spaced, respectively, at 120° intervals) to carry a given load. That is, this improved tooth design creates greater areas of tooth engagement as well as increasing the number of teeth in contact at any given time, making it possible to meet automotive specifications with two fewer gears. Of course, this same tooth design can make it possible to carry significantly greater loads with the conventional three pairs of combination gears. Also, as different from conventional line contact that concentrates the load, the contact pattern of this gearing spreads the load over a relatively larger area and results in less shearing of the lubricating oil film, thereby permitting the use of lower viscosity lubricants and assuring longer part life.

A salient feature of the crossed-axis gear complex of high-traction differentials is the mechanical advantage resulting from the worm/worm-wheel combination in the gear train between the vehicle's wheels and the differential. As a vehicle travels around curves, the weight and inertia of the vehicle cause the wheels to roll simultaneously over the surface of the road at varying speeds, resulting in the need for differentiation. The initiation of such differentiation is greatly enhanced by a mechanical advantage between the side-gear worms and their mating worm-wheels. Of course, this same gearing results in mechanical disadvantage when torque is being transferred in the opposite direction. The preferred embodiments of the IsoTorque™ differential select 35°/55° for the worm/worm-wheel teeth to provide both full traction as well as relative ease of differentiation, a selection that also makes the differential particularly appropriate for vehicles including automatic braking systems (ABS) having traction controls.

A further feature of the IsoTorque™ differential provides torque balancing that equalizes the end thrust on the respective side-gear worms during vehicle turning, when being driven in either forward or reverse, regardless of the direction of travel. A thrust plate is supported by the same mounting that supports the sets of paired combination gears, the thrust plate being fixed against lateral movement and maintained between the inner ends of the side-gear worms. Thus, when under thrust to the left, the right worm exerts a thrust force x against the thrust plate, and the left worm exerts only its own thrust force x against the housing rather than the 2x force as in previous differentials. Similarly, when under thrust to the right, the left worm exerts a thrust force x against the thrust plate, and the right worm exerts only its own thrust force x against the housing.

This just described torque-balancing feature can be seen in the second embodiment shown in FIGS. 2A and 2B. The differential incorporates a complete worm/worm-wheel gear complex. The housing 120 is formed, preferably, in one piece from powder metal and has only three openings. Namely, a first set of appropriate openings 121, 122 is aligned along a first axis 125 for receiving the respective inner ends of output axles (not shown), and only a single further opening 126, which is rectangular in shape and extends directly through housing 120, is centered perpendicular to axis 125.

Two pair of combination gears 131, 132 and 129, 130 each have respective spur gear portions 133 separated by an hourglass-shaped worm-wheel portion 134 that are designed and manufactured as described above. The respective spur gear portions 133 of each pair are in mesh with each other, and all of these combination gears are rotatably supported on sets of paired hubs 136, 137 that are formed integrally with an opposing pair of mounting plates 138, 139. The respective worm-wheel portions 134 of combination gear pair 131, 132 are in mesh with respective ones of a pair of side-gear worms 141, 142, while the respective worm-wheel portions 134 of combination gear pair 129, 130 are similarly in mesh with, respectively, the same pair of side-gear worms 141, 142.

Positioned intermediate the inner ends of side-gear worms 141, 142 is a thrust plate 150. Thrust plate 150 includes respective bearing surfaces 152, 153, mounting tabs 156, 157, and a weight-saving lubrication opening (not shown). Mounting tabs 156, 157 are designed to mate with slots 160, 161 formed centrally in identical mounting plates 138, 139. Slots 160, 161 not only position thrust plate 150 intermediate the inner ends of side-gear worms 141, 142 but also prevent lateral movement of thrust plate 150. Therefore, referring specifically to FIG. 2A, when driving torque applied to side-gear worms 141, 142 results in thrust to the left, worm 142 moves against fixed bearing surface 152 of thrust plate 150, while worm 141 moves away from fixed bearing surface 153 of thrust plate 150 and against housing 120 (or against appropriate washers positioned conventionally between worm 141 and housing 120). The resulting friction against the rotation of worm 141 is unaffected by the thrust forces acting on worm 142.

Similarly, when driving torque applied to side-gear worms 141, 142 results in thrust to the right, worm 141 moves against fixed bearing surface 153 of thrust plate 150, while worm, 142 moves away from fixed bearing surface 152 of thrust plate 150 and against housing 120 (or, again, against appropriate washers positioned conventionally between worm 142 and housing 120). Similarly, the resulting friction against the rotation of worm 142 is unaffected by the thrust forces acting on worm 141. Thus, regardless of the direction of the driving torque, the friction acting against the rotation of each side-gear worm is not affected by the thrust forces acting on the other side-gear worm. Since the torque bias of the differential is affected by frictional forces, this prevention of additive thrust forces helps to minimize torque imbalance, i.e., differences in torque during different directions of vehicle turning.

Steer Drive Structure

Figure 3:
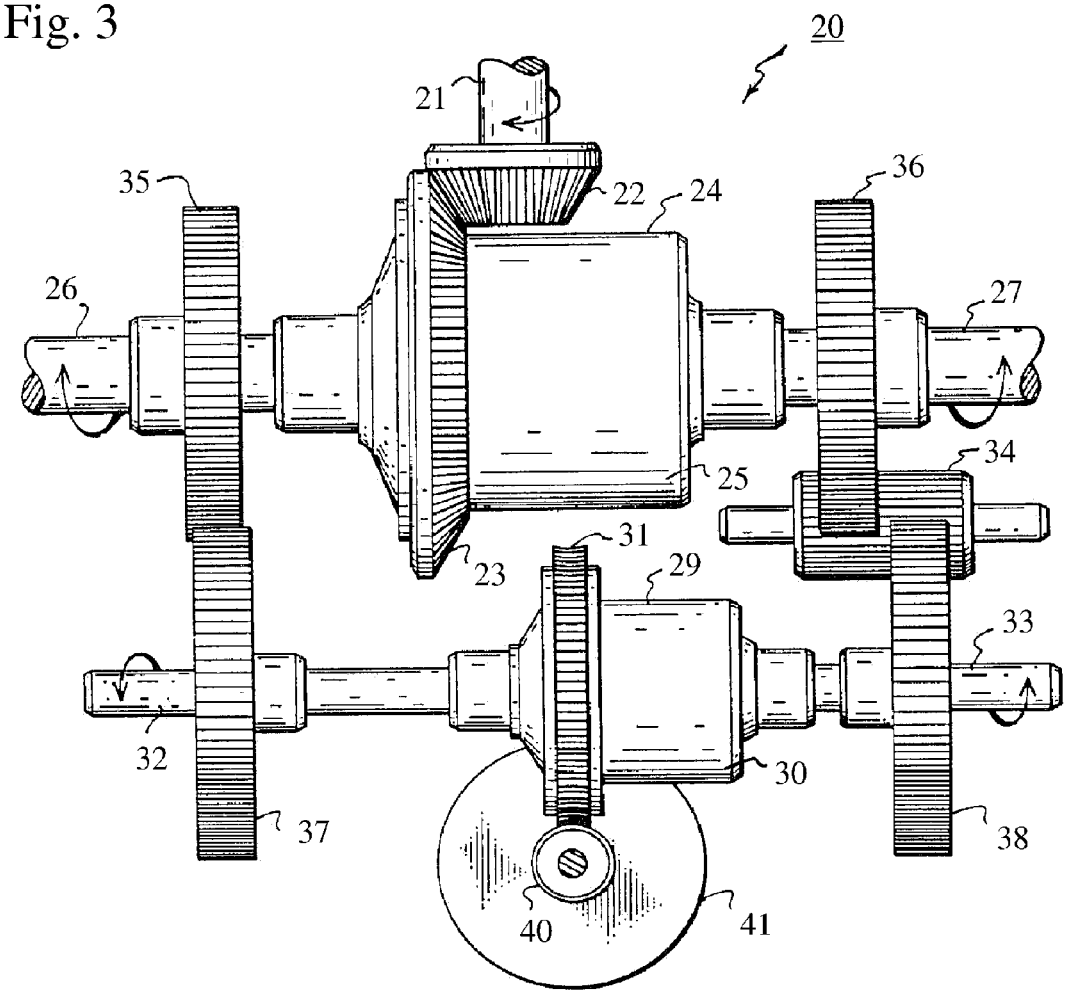
FIG. 3 is a partially schematic view of a steer drive according to the present invention.

As shown in FIG. 3, when a steer drive of the present invention 20 is applied to a vehicle, engine power input via shaft 21 turning gear 22 rotates ring gear 23 and case 24 of a drive differential 25. Drive differential 25 is connected for driving a pair of respective axle shafts 26 and 27 for differentially driving respective left and right driving traction elements on opposite sides of the vehicle. Drive differential 25 is suitably sized to the vehicle being driven. This can range from small garden tractors and tillers up to large tractors and earth movers.

A steering differential 30 having a case 29 is connected between a pair of steering control shafts 32 and 33 that are interconnected in a driving relationship with axle drive shafts 26 and 27. One steering control shaft 33 and one axle drive shaft 27 are connected for rotation in the same direction, and another steering control shaft 32 and another axle drive shaft 26 are connected for rotation in opposite directions. This causes counter or differential rotation of control shafts 32 and 33 as axle shafts 26 and 27 rotate in the same direction and conversely causes differential rotation of axle shafts 26 and 27 as control shafts 32 and 33 rotate in the same direction.

At least one of the differentials 25, 30 of the present invention is an all-gear limited-slip type of differential (e.g., the "Synclinal Gearing" disclosed in U.S. Pat. No. 3,735,647, the "Compact Full-Traction Differential" disclosed in U.S. Pat. No. 6,783,476, or the "Full-Traction Differential" disclosed in copending application Ser. No. 11/553,603, filed Oct. 27, 2006). This is in opposition to the teachings of the prior art that clearly teach using only unlimited-slip differentials. In the preferred embodiment of the invention, the drive differential 25 is an all-gear limited-slip type differential, and the steering differential 30 is a conventional unlimited-slip differential. In another embodiment of the invention, the drive differential 25 is a conventional unlimited-slip differential, and the steering differential 30 is an all-gear limited-slip type differential.

As shown in FIG. 3, gear connections between steering control shafts and axle drive shafts are preferred for larger and more powerful vehicles. These include axle shaft gears 35 and 36 fixed respectively to axle shafts 26 and 27 and control shaft gears 37 and 38 fixed respectively to control shafts 32 and 33.

Meshing axle shaft gear 35 with control shaft gear 37 provides opposite rotation between axle shaft 26 and control shaft 32, and meshing both axle shaft gear 36 and control shaft gear 38 with idler gear 34 provides same direction rotation for axle shaft 27 and control shaft 33.

Gear connections between steering control shafts and axle drive shafts are preferably incorporated into an enlarged housing containing both drive differential 25 and steering differential 30. For a reason explained below, steering differential 30 can be sized to bear half the force borne by drive differential 25 so that the complete assembly can be fitted within a differential housing that is not unduly large.

Smaller or less powerful vehicles can use shaft interconnections such as belts or chains in place of gearing. Also, shaft interconnections need not be limited to the region of the axle differential and can be made toward the outer ends of the axle shafts.

A gear or drive ratio between steering control shafts and axle drive shafts is preferably 1:1. This ratio can vary, however, so long as it is the same on opposite sides of the axle and control differentials.

An input steering gear 40 meshes with a ring gear 31 fixed to casing 29 of steering differential 30 for imposing differential rotation on the system. Gear 40 is preferably a worm gear, and ring gear 31 is preferably a worm-wheel so that ring gear 31 turns only when gear 40 turns.

For steering purposes, steering gear 40 can be turned by several mechanisms, depending on the relative loads. Steering mechanisms can use various types of appropriately sized motors for turning gear 40. For instance, a DC starter motor 41 can be electrically energized via a rheostat in the steering system, or a hydraulic or pneumatic motor 41 can be turned by a vehicle's hydraulic or pneumatic system in response to a steering control. Preferably, motor 41 is hydraulic, and the worm 40/worm-wheel 31 ratio is at least 15:1.

As indicated above, slipping occurs with prior art differential steering systems when the vehicle is being steered because the steering drive motor is moving the otherwise locked-up worm/worm-wheel drive of the steering differential and, thus, both differentials are differentiating. Under this condition, should one of the tracks suddenly lose traction, the torque imbalance allows the slipping track to increase in speed, reducing the drive torque and speed of the other track in direct relation to the increased speed of the slipping track in prior art systems.

When the conventional differential used by prior art differential steering systems for drive differential 25 is replaced, as indicated above in the preferred embodiment of the present invention, with an all-gear limited-slip differential (e.g., the IsoTorque™ differential described in U.S. Pat. No. 6,783,476) that does not slip when torque is suddenly reduced, this undesirable condition is prevented.

However, it is important to note that this revision does not otherwise affect the operation of the basic steer-drive, which continues to function in the same manner. Namely, when the vehicle is being driven in a straight direction, the non-rotation of the steering gear 40/ring gear 31 combination still causes both differentials to act as straight axles, and when the vehicle operator indicates a change in direction by turning the vehicle's steering wheel, the steering motor turns the housing of the differential either forward or in reverse, and the speeds of the tracks are respectively increased and decreased to accomplish the change of direction as explained in U.S. Pat. No. 4,776,235.

However, since the invention's drive differential 25 is an all-gear limited-slip differential, whenever the torque load shared by the tracks suddenly begins to become unbalanced, the torque bias of drive differential 25 immediately transfers a substantial portion of the drive torque received from engine input shaft 21 to the track having the better traction (e.g., up to eight times as much torque in a 8:1 differential). Thus, as soon as the traction load on either track results in a significant load imbalance, a sufficient portion of the drive torque is still delivered to the track having better traction to maintain movement of the tracked vehicle.

No-Slip Steer-Drive Operation and Pivot Turning

Two important effects occur from the interconnection of steering differential 30 and its control shafts 32 and 33 with axle drive differential 25 and axle shafts 26 and 27. One is a no-slip drive that prevents wheels or tracks from slipping unless slippage occurs on both sides of the vehicle at once. The other effect is imposed differential rotation that can accomplish steering to pivot or turn a vehicle.

The no-slip drive occurs because axle drive shafts 26 and 27 are geared together via steering differential 30. Power applied to an axle shaft on a side of the vehicle that has lost traction is transmitted to the connecting control shaft on that side, through differential 30 to the opposite control shaft, and back to the opposite axle shaft where it is added to the side having traction. So if one axle shaft loses traction, the opposite axle shaft drives harder, and the only way slippage can occur is if both axle shafts lose traction simultaneously.

To elaborate on this, consider a vehicle rolling straight ahead with its axle shafts 26 and 27 turning uniformly in the same direction. Steering gear 40 is stationary for straight ahead motion, and since steering gear 40 is preferably a worm gear, worm-wheel 31 of steering differential 30 cannot turn. Control shafts 32 and 33, by their driving connections with the axle drive shafts, rotate differentially in opposite directions, which steering differential 30 accommodates.

Drive differential 25 equally divides the power input from engine drive shaft 21 and applies half of the input power to each axle shaft 26 and 27. If the track or wheel being driven by axle shaft 26 loses traction, it cannot apply the power available on shaft 26 and tends to slip. Actual slippage cannot occur, however, because axle shaft 26 is geared to control shaft 32. So if a wheel or track without traction cannot apply the power on shaft 26, this is transmitted to control shaft 32, which rotates in an opposite direction from axle shaft 26. Since ring gear 31 cannot turn, rotational power on control shaft 32 is transmitted through differential 30 to produce opposite rotation of control shaft 33. This is geared to axle shaft 27 via idler gear 34 so that power on control shaft 33 is applied to axle shaft 27 to urge shaft 27 in a forward direction, driving the wheel or track that has traction and can accept the available power. Since only half of the full available power can be transmitted from one axle shaft to another via differential 30 and its control shafts, these can be sized to bear half the force borne by axle differential 25 and its axle shafts.

Of course, unusable power available on axle shaft 27, because of a loss of traction on that side of the vehicle, is transmitted through the same control shaft and control differential route to opposite axle shaft 26. This arrangement applies the most power to the wheel or track having the best traction, which is ideal for advancing the vehicle. The wheel or track that has lost traction maintains rolling engagement with the ground while the other wheel or track drives. The only time wheels or tracks can slip is when they both lose traction simultaneously.

To impose differential rotation on axle shafts 26 and 27 for pivoting or turning the vehicle, it is still only necessary to rotate steering gear 40. This differentially rotates axle shafts to turn or pivot the vehicle because of the different distances traveled by the differentially rotating wheels or tracks on opposite sides of the vehicle.

Whenever steering gear 40 turns, it rotates ring gear 31, which turns the casing 29 of steering differential 30 to rotate control shafts 32 and 33 in the same direction. The connection of control shafts 32 and 33 with axle drive shafts 26 and 27 converts the same direction rotation of control shafts 32 and 33 to opposite differential rotation of axle shafts 26 and 27, as accommodated by drive differential 25. This drives wheels or tracks forward on one side of the vehicle and rearward on the other side of the vehicle, depending on the direction of rotation of steering gear 40.

Such differential rotation is added to whatever forward or rearward rotation of the axle shafts is occurring at the time. So if a vehicle is moving forward or backward when steering gear 40 turns, the differential rotation advances and retards opposite axle shafts and makes the vehicle turn.

Figure 4:
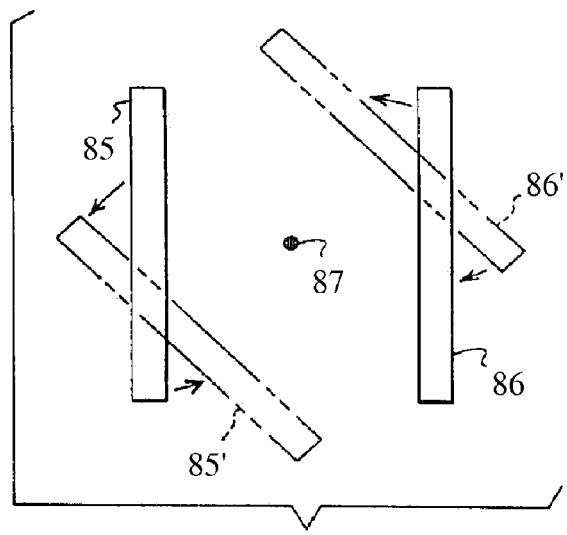
FIG. 4 shows a schematic view of a tracked vehicle executing a pivot turn made possible by the present invention.

If a vehicle is not otherwise moving when steering gear 40 turns, the vehicle's left and right driving traction elements (wheels or tracks) go forward on one side and backward on the other side so that the vehicle pivots on a central point. Such a pivot turn is schematically illustrated in FIG. 4 for a vehicle having a pair of tracks 85 and 86. Both tracks can have a rolling engagement with the ground as the vehicle rotates around a center point 87 by driving right track 86' forward and left track 85' rearward. The tracks experience some heel and toe scuffing, but this causes less stress and disturbance of the terrain than is caused by the traditional locking of one track by a brake while the other track is driven. The pivot turn also spins the vehicle on one point 87, without requiring motion in any direction as must occur when one track is braked and another is driven.

In prior art steer drives, the above-described no-slip drive functions only so long as the vehicle is traveling straight ahead or straight back and steering gear 40 and steering differential 30 are not operating in response to the driver's rotation of the vehicle's steering wheel. However, as explained above, in prior art steer drives, when steering differential 30 is differentiating and one of the tracks completely loses traction, the steer drive introduces differential action between the tracks, and the drive torque of the vehicle can still be completely lost if that track continues to slip. This total loss of driving torque does not occur with the improved steer drive of the invention herein.

Namely, since drive differential 25 is an all-gear limited-slip differential, whenever the torque load shared by the tracks suddenly begins to become unbalanced, the torque bias of drive differential 25 immediately transfers a substantial portion of the drive torque received from engine input shaft 21 to the track having the better traction (e.g., this transfer of drive torque occurs up to a torque imbalance of eight times in an 8:1 differential). Thus, as soon as the traction load on either track results in a significant load imbalance, a sufficient portion of the drive torque is still delivered to the track having better traction to maintain movement of the tracked vehicle.

Improved Pivot Turning

As indicated above, during pivot turning with prior differential steering systems, the operator of a tracked vehicle generally applies a brake to, or otherwise holds, the engine drive shaft in a locked condition. With heavy, relatively slow-moving off-road vehicles operating in terrain where traction can vary greatly between tracks, conditions arise when pivot turning is desired but the usual locking of the engine drive shaft is not appropriate. As explained above, under such conditions, severe traction imbalance can result in undesirable loss of pivot turn motion.

To facilitate pivot turning for such vehicles, the present invention replaces the traditional steering differential with an all-gear limited-slip type of differential (e.g., IsoTorque™ differential), as previously described above, that does not slip when torque imbalance occurs. This simple change overcomes pivot turn problems under all conditions so long as one track retains traction. Namely, in this just-described second embodiment of the present invention, steering differential 30 is an all-gear limited-slip type of differential that prevents slip when traction is suddenly reduced under one track when pivot turning a slow-moving off-road tracked vehicle.

Both Embodiments Enhanced

Figure 5:
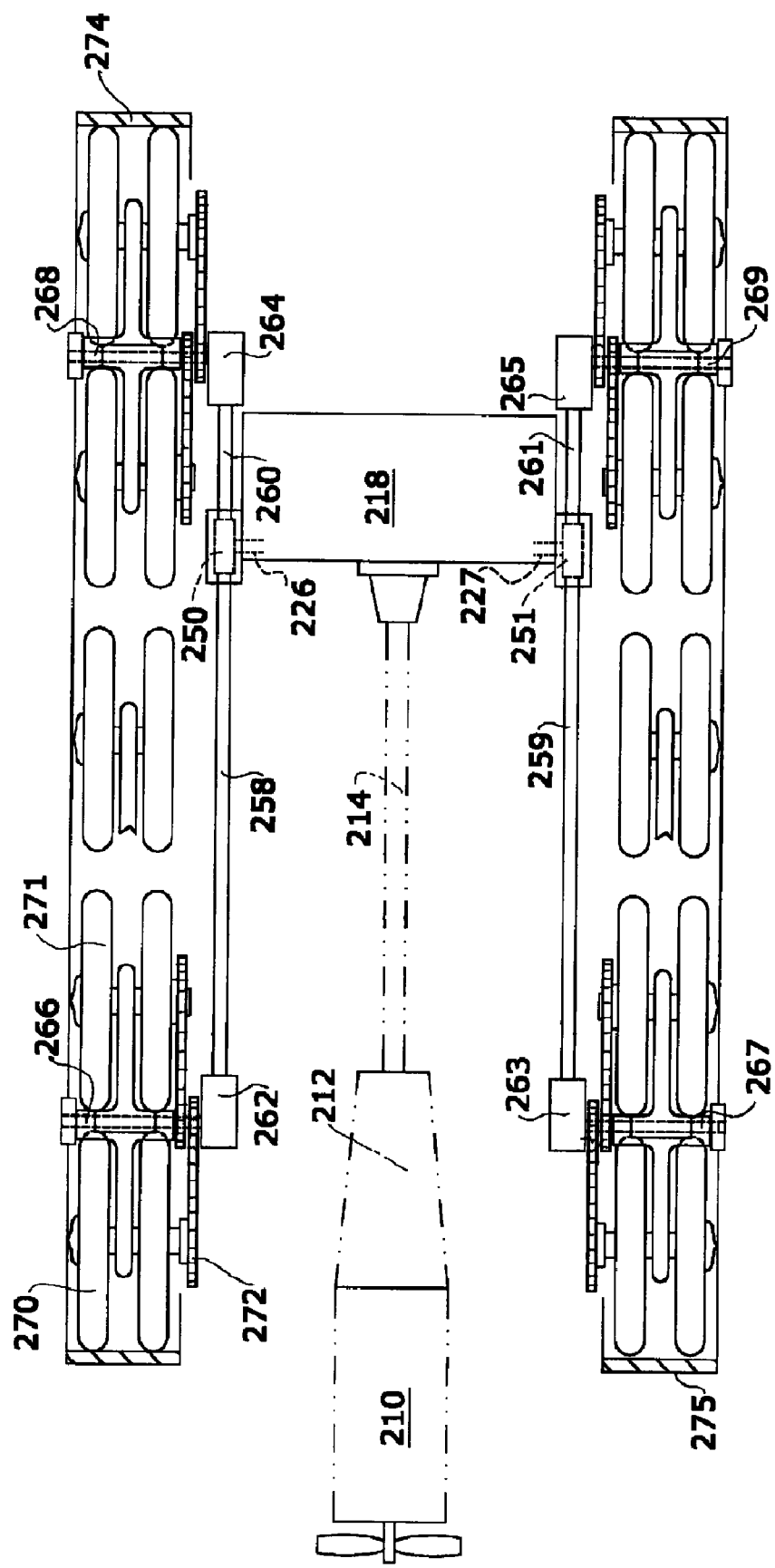
FIG. 5 is a schematic view of a preferred embodiment of the present invention used in a tracked vehicle.
Figure 6:
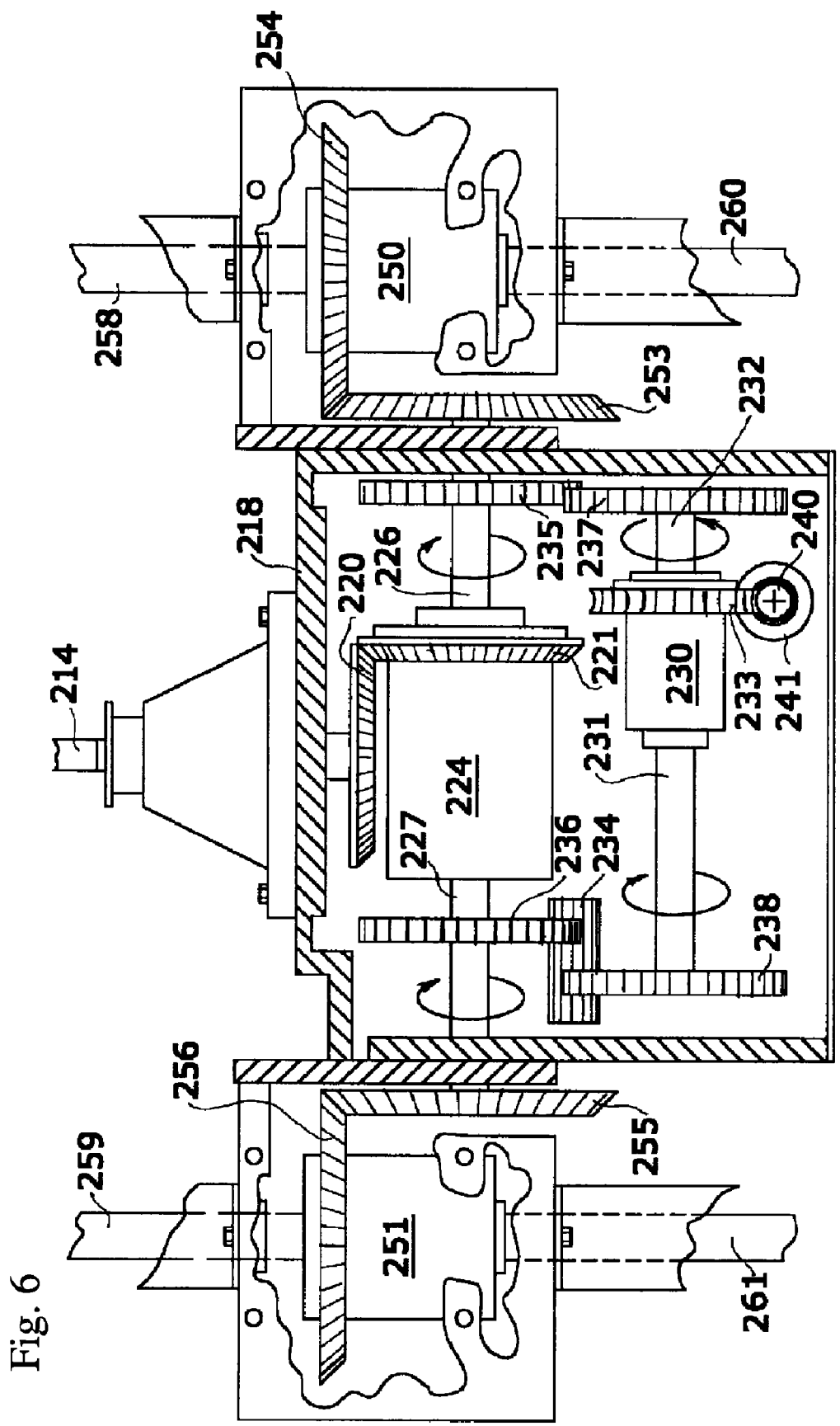
FIG. 6 is an enlarged schematic partially cross sectional top view, with some parts and cross-hatching omitted to enhance clarity, of selected portions of the drive and steering differentials as well as the left-side and right-side differentials shown in FIG. 5.

The embodiments just described above can both be enhanced by providing an additional left-side all-gear limited-slip differential and an additional right-side all-gear limited-slip differential for dividing the torque delivered to a respective pair of drive axles associated with each track. This extension embodiment is illustrated schematically in FIGS. 5 and 6. FIG. 5 is a schematic top view of the drive elements of a tracked vehicle, showing (in darker lines) the invention's all-gear limited-slip steer drive 218 in combination with two additional all-gear limited-slip differentials, namely, right-side differential 250 and left-side differential 251, while FIG. 6 is an enlarged partially schematic view of these four last-named differentials.

The drive path for the tracked vehicle (shown in FIGS. 5 and 6) is as follows: an engine 210 is connected to a transmission 212 for transmitting torque to a central drive shaft 214 that drives a pair of bevel gears 220, 221 delivering driving torque to the steer-drive unit 218, the bevel gear 221 providing differentiated driving and steering torque to the vehicle's respective left and right driving traction elements through respective right drive shaft 226 and left drive shaft 227, in the manner explained in considerable detail above.

Respective drive shafts 226, 227 operate respective bevel gears 253, 254 and 255, 256 delivering driving torque to right-side differential 250 and left-side differential 251 that, respectively, further differentiate their respective driving torque through their respective front drive shafts 258, 259 and rear drive shafts 260, 261, the drive shafts 258, 259, 260, 261 being connected respectively to front right-angle boxes 262, 263 and rear right-angle boxes 264, 265. As is well known in the art, the right-angle boxes include pairs of bevel gears (not shown) that deliver respective torque to front and rear pairs of drive axles, namely, front right- and left-drive axles 266, 267 and rear right- and left-drive axles 268, 269. Each drive axle is positioned between a pair of tandem wheels, e.g., front right-drive axle 266 is positioned between tandem pair of wheels 270, 271, driving at least one wheel of each tandem pair by means of a respective chain 272.

In the preferred tracked vehicle shown, each wheel is a dual wheel, and the respective right and left tracks 274, 275 are positioned over the mating surfaces of the sets of dual wheels mounted on each side of the vehicle, all in the manner well known in the art and explained in detail in above-cited U.S. Pat. No. 6,135,220.

Referring to FIG. 6, steering differential 230 and its connecting shafts 231, 232 and gears 233, 234, 235, 236, 237, 238 all operate in exactly the same manner as the corresponding parts that are shown in FIG. 3 and explained in detail above. The steering gear worm 240 and the motor 241 to turn steering gear worm 240 are also shown in FIG. 6. Motor 241 is preferably either a DC motor or a hydraulic motor responsive to indications of the desired direction of vehicle operation generated by the vehicle's steering wheel.

Each additional all-gear limited-slip differential 250, 251 (a) prevents "wind up" between the front and rear portions of its respective track 274, 275 that might otherwise occur when the supporting wheels of the track move up and down at different times over uneven terrain and (b) increases the efficiency of the front and rear track drives by directing more torque to the respective drive axle which has the best frictional connection to the track at any given moment.

Thus, with the just-described "enhanced" version of the preferred embodiment of the invention, the all-gear limited-slip drive differential 224 of steer drive 218 divides the torque between the respective drive shafts 226, 227 directing the engine torque to the respective right and left tracks, while the two additional all-gear limited-slip differentials 250, 251 further divide each respective track torque between the front and rear drive axles of each respective track.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A differential steering-drive for a vehicle having respective left and right driving traction elements, a propulsion engine with an engine drive shaft, and a steering wheel rotatable by an operator to indicate an intended direction of travel, said steering-drive comprising:
   a drive differential interconnecting said engine drive shaft and a pair of respective track drive shafts for differentially driving said respective left and right driving traction elements; and
   a steering differential operatively interconnecting said steering wheel and said respective track drive shafts so that:
      rotation of said steering wheel in a first direction causes rotation of said steering differential in a first direction and rotation of said steering wheel in an opposite direction causes rotation of said steering differential in an opposite, the speed of rotation of said steering differential in each direction being proportional to the angular rotation of said steering wheel; and
      the rotation of said steering differential in said first direction results in the rotation of said respective track drive shafts in opposite directions; and
   wherein said differential steering-drive further comprises one of the following combinations:
      (a) at least one of said drive and steering differentials comprises an all-gear limited-slip differential; and
      (b) said drive differential and said steering differential each comprise an all-gear limited-slip differential.

2. The differential steering-drive of claim 1, wherein each said respective left and right driving traction element further comprises a respective plurality of wheels operatively connected to at least one pair of drive axles;
   a left-side differential and a right-side differential each delivering, respectively, divided torque to each drive axle of one of said respective pairs of drive axles;
   said left-side and right-side differentials each being driven respectively by said pair of respective drive shafts for differentially driving said respective left and right driving traction elements; and
   wherein said left-side and right-side differentials also each comprise an all-gear limited-slip differential.

3. The differential steering-drive of claim 2, wherein said respective left and right driving traction elements each comprise an endless track in driving contact with said respective plurality of wheels.

4. The differential steering-drive of claim 3, wherein each said respective plurality of wheels comprises at least one pair of tandem wheels in contact with said endless track and wherein one of said respective drive axles is positioned intermediate said pair of tandem wheels.

5. The differential steering-drive of claim 1, wherein said all-gear limited-slip differential comprises a gear complex comprising:
   a pair of side-gear worms, each side-gear worm being mounted for rotation about an output axis and fixed to a respective output axle; and
   at least two sets of paired combination gears, each combination gear of each pair having (a) an axis of rotation that is substantially perpendicular to said output axis, and (b) a first gear portion spaced apart from a worm-wheel portion, said first gear portions of said combination gear pair being in mating engagement with each other, and said worm-wheel portions of said combination gear pair being in mating engagement, respectively, with a respective one of said side-gear worms.

* * * * *